(12) United States Patent
Kästel

(10) Patent No.: US 8,463,683 B2
(45) Date of Patent: Jun. 11, 2013

(54) UNSTEADINESS COMPENSATION IN VALUATION SYSTEMS AND METHODS

(75) Inventor: Peter Kästel, Edenkoben (DE)

(73) Assignee: Deutsche Boerse AG, Frankfurt am Main (DE)

( * ) Notice: Subject to any disclaimer, the term of this patent is extended or adjusted under 35 U.S.C. 154(b) by 2827 days.

(21) Appl. No.: 10/990,751

(22) Filed: Nov. 18, 2004

(65) Prior Publication Data

US 2005/0144104 A1    Jun. 30, 2005

(30) Foreign Application Priority Data

| Nov. 19, 2003 | (EP) | ................................. | 03026605 |
| Apr. 15, 2004 | (EP) | ................................. | 04009013 |
| Oct. 22, 2004 | (EP) | ................................. | 04025198 |

(51) Int. Cl.
*G06Q 40/00* (2012.01)

(52) U.S. Cl.
USPC ....................................... 705/36 R

(58) Field of Classification Search
USPC ................ 705/4, 35, 36 R, 37, 38
See application file for complete search history.

(56) References Cited

U.S. PATENT DOCUMENTS

| 5,812,988 | A | * | 9/1998 | Sandretto | ..................... | 705/36 R |
| 5,857,176 | A | * | 1/1999 | Ginsberg | ..................... | 705/36 R |
| 7,333,950 | B2 | * | 2/2008 | Shidler et al. | ..................... | 705/35 |
| 2002/0055897 | A1 | * | 5/2002 | Shidler et al. | ..................... | 705/35 |
| 2002/0095361 | A1 | * | 7/2002 | Trenk et al. | ..................... | 705/35 |
| 2003/0083972 | A1 | * | 5/2003 | Williams | ..................... | 705/36 |
| 2003/0115125 | A1 | * | 6/2003 | Lee et al. | ..................... | 705/36 |
| 2004/0138971 | A1 | * | 7/2004 | Helms | ..................... | 705/35 |
| 2005/0010481 | A1 | * | 1/2005 | Lutnick et al. | ..................... | 705/26 |
| 2005/0044029 | A1 | * | 2/2005 | Griffin et al. | ..................... | 705/36 |
| 2005/0080734 | A1 | * | 4/2005 | Lynch et al. | ..................... | 705/40 |

* cited by examiner

*Primary Examiner* — Jason M Borlinghaus
*Assistant Examiner* — Martin Gottschalk
(74) *Attorney, Agent, or Firm* — Marc S. Kaufman; Reed Smith LLP

(57) ABSTRACT

There is provided a data processing system and method for valuing a bundle of constructs that may individually fail, in case of a separation event causing the bundle of constructs to separate a failing construct from the bundle. A present value determination unit applies a predefined model to determine a present value of the bundle of constructs after having separated the failing construct from the bundle. Further, a static value determination unit determines a static value by reducing a static base number each time a separation event occurs. Furthermore, a calculation unit calculates a value of the bundle of constructs based on the determined present value and the determined static value. The calculation unit is adapted to calculate a sum of the determined present value and the determined static value. In an embodiment, the bundle of constructs is a basket of credit default swaps.

23 Claims, 2 Drawing Sheets

UNSTEADINESS COMPENSATION IN VALUATION SYSTEMS AND METHODS

BACKGROUND OF THE INVENTION

1. Field of the Invention

The invention generally relates to data processing systems and methods, and more particularly to systems and methods for valuing a bundle of constructs that may individually fail, in case of a separation event causing a bundle of constructs to separate a failing construct from the bundle.

2. Description of the Related Art

Many techniques exist where a bundle of constructs is used that may individually fail. Constructs may be hardware arrangements in computer systems or other automated systems, or may be software routines. It is further well known in the art that even more abstract constructs exist such as a conditional relationship between physical or non-physical entities.

Any such construct may fail, in the sense that the task or function assigned to that construct is not (completely) fulfilled. For instance, a hardware component may break, a software routine may disfunction or even stop to be performed, or a condition can lead to negative results or can be rendered void.

Another field where such techniques can be applied to is the valuation of futures contracts that are based on a basket of credit default swaps as underlyings. Credit default swaps are the most commonly traded credit derivatives. A credit default swap is a contract where one party (the "protection seller") receives a premium from another party (the "protection buyer") for assuming the credit risk of a specified obligation. In return for this premium, the protection buyer will receive a payment from the protection seller upon the occurrence of a credit event.

Generally considering bundles of constructs, any failing construct may be separated from the bundle. For instance, a failing hardware component may be separated from other hardware elements, and a failing software routine may be separated in the sense that the remaining software continues to work. In the example of a basket of credit default swaps, the credit default swap having failed may be removed from the basket.

When valuing such bundles of constructs, a value is to be determined that is somehow descriptive for the bundle or one or more of its properties. Taking the example of a bundle of hardware constructs, the bundle may be valued to calculate a value indicating a degree of functionality, completeness, utility or usability. The value may also indicate any other property of the hardware arrangement such as an overall response time, a data processing capacity, or the like. Taking the example of a bundle of software routines, the value may be similar in that it describes a degree of errorlessness, processing speed, or the like. In the example of a basket of credit default swaps, the value may be the price of the futures contract.

In case of a separation event, the present value of a bundle of constructs will experience some unsteadiness. For instance, if the value of the bundle of constructs indicates some functionality degree, a separation event that causes a failing construct to be separated from the bundle will lead to an abrupt change in the value. Similarly, separating a credit default swap from a basket will lead to price swings.

Such unsteadiness, however, is often undesirable in case the value of the bundle of constructs is monitored over time. It is therefore found desirable to achieve a valuation technique for a bundle of constructs where the observable influence of a separation event is reduced.

SUMMARY OF THE INVENTION

The invention is provided by the independent claims. Preferred embodiments are specified in the dependent claims.

In an embodiment, there is provided a data processing system for valuing a bundle of constructs that may individually fail, in case of a separation event causing the bundle of constructs to separate a failing construct from the bundle. The system comprises a present value determination unit for applying a predefined model to determine a present value of the bundle of constructs after having separated the failing construct from the bundle. Further, the system comprises a static value determination unit for determining a static value by reducing a static base number each time a separation event occurs. Furthermore, the system comprises a calculation unit for calculating a value of the bundle of constructs based on the determined present value and the determined static value, wherein the calculation unit is adapted to calculate a sum of the determined present value and the determined static value.

In another embodiment, a data processing method for valuing a bundle of constructs that may individually fail, in case of a separation event causing the bundle of constructs to separate a failing construct from the bundle, comprises applying a predefined model to determine a present value of the bundle of constructs after having separated the failing construct from the bundle, determining a static value by reducing a static base number each time a separation event occurs, and calculating a value of the bundle of constructs based on the determined present value and the determined static value. Calculating the value of the bundle of constructs comprises calculating a sum of the determined present value and the determined static value.

In yet another embodiment, there is provided a data processing system for valuing a futures contract that is based on a basket of credit default swaps as underlyings, in case of a separation event causing said futures contract to separate a failing credit default swap from the basket. The system comprises a present value determination unit for applying a market pricing model to determine a present value of the futures contract after having separated the failing credit default swap from the basket. The system further comprises a static value determination unit for determining a static value by reducing a static base number each time a separation event occurs. Moreover, the system comprises a contract value calculation unit for calculating a futures contract value based on the determined present value and the determined static value. The contract value calculation unit is adapted to calculate a sum of the determined present value and the determined static value.

In still a further embodiment, there is provided a data processing method of valuing a futures contract that is based on a basket of credit default swaps as underlyings, in case of a separation event causing the futures contract to separate a failing credit default swap from the basket. The method comprises applying a market pricing model to determine a present value of the futures contract after having separated the failing credit default swap from the basket, determining a static value by reducing a static base number each time a separation event occurs, and calculating a futures contract value based on the determined present value and the determined static value. Calculating the futures contract value comprises calculating a sum of the determined present value and the determined static value.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein:

FIG. 3-1 is a time chart illustrating an example of a static value determined according to an embodiment of the invention;

FIG. 3-2 is a time chart illustrating an example of a current market spread used to determine a present value according to an embodiment of the invention;

FIG. 3-3 is a time chart illustrating an example of a present value determined according to an embodiment of the invention;

FIG. 3-4 is a time chart illustrating an example of a premium value determined according to an embodiment of the invention; and FIG. 3-5 is a time chart illustrating an example of a futures contract value calculated according to an embodiment of the invention.

DETAILED DESCRIPTION OF THE INVENTION

The illustrative embodiments of the present invention will be described with reference to the figure drawings wherein like elements and structures are indicated by like reference numbers. Further reference is made to the glossary of terms at the end of the present description.

In the following, embodiments will be described with respect to futures contracts that are based on baskets of credit default swaps as underlyings. It is however to be noted that generally, a data processing system 100 is provided for valuing a bundle of constructs that may individually fail, in case of a separation event causing a bundle of constructs to separate a failing construct from the bundle.

In general, when operating a bundle of constructs that may individually fail, the overall failure risk may depend on the individual failure probabilities. The failure risk may also change with the time. In this case, it is sometimes found to be detrimental that failure events are not exactly predictable. For this reason, the failure risk pertaining to a bundle of constructs may be transferred to an entity that then assumes the overall failure risk. For instance, a hardware controller or a software program may assume the risk that one or more computer hardware or software constructs fail, by stepping into the functions of these constructs in case of a failure.

To compensate or counterbalance this transfer of a failure risk, the risk assuming entity may receive an extra resource amount. Resources may for instance be processor access times, memory capacity, prioritization over other components in the handling of tasks, etc.

In the context of credit default swaps baskets, a construct may be considered to be a credit default swap, a bundle to be a basket, and a failure risk to be the risk of a credit event occurring, and a resource amount to be a premium payment and/or a default payment and/or a present value.

System Architecture and General Overview

Figure 1:
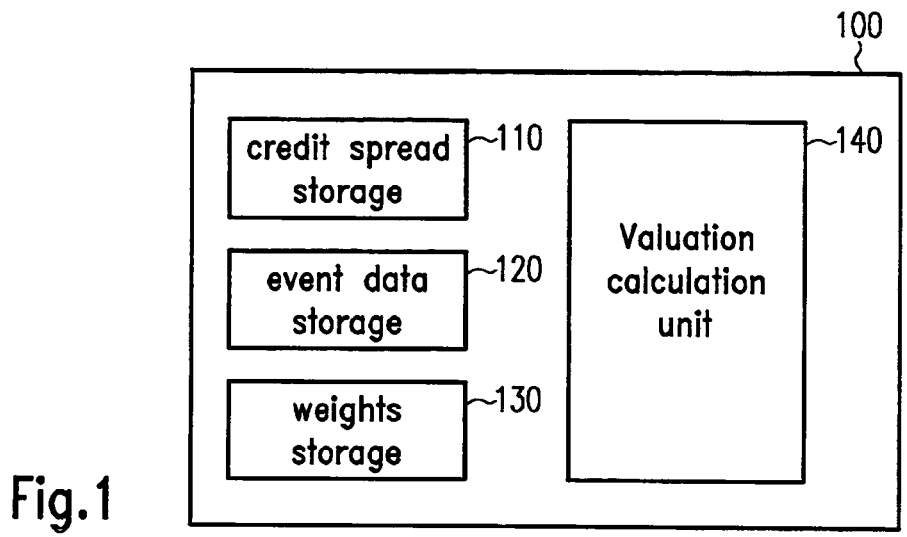
FIG. 1 illustrates a data processing system according to an embodiment of the invention.

Referring now to FIG. 1, a data processing system that may be used in conjunction with the invention comprises a data storage 110-130 for storing credit spreads, event data, and weights, and a calculation unit 140 for calculating the contract value in step 230. These functions will become more apparent from the detailed description below.

Going into some detail, an index may be defined on the first trading day of the futures contract. The index may initially consist of N obligors, each of which are liquidly traded in the credit markets (e.g. the default swap market), so that the credit spread of each obligor is observable.

The futures contract is based on the present value of an underlying credit default swap. At any time the notional of the default swap is deemed to be the contract notional multiplied by $\Sigma n_i$, where $n_i$ is the weight of the $i^{th}$ obligor in the index, and where the sum is only taken over the obligors in the index that have not suffered a credit event by that time. The default swap may mature at a fixed date (e.g. 5 years) after the maturity of the futures contract.

The appropriate credit spread for valuation of the default swap may be the average credit spread of the obligors in the basket that have not suffered a separation event. Alternatively, the average may be defined as arithmetic average, or may be a weighted average.

Following a failure event on the $i^{th}$ obligor in the index, the futures contract separates into two contracts: a futures contract based on a credit default swap based on the non-separated names, and a futures contract based on a credit default swap based on the separated name. Each of these contracts may be traded separately. Furthermore, multiple separations may occur, so that there may be a number of futures contracts each based on one separated obligor, and one futures contract based on the remaining non-separated obligors. Each of these contracts may trade independently of the others.

Some time may elapse between a separation event and a credit event. During this period the contract based on the separated name will continue to trade on the futures exchange. It may be understood that the market price of this contract may reflect the market view of the likely value of LGD. The market value may be calculated by reference to a credit spread and the CDS formula (1), or estimates of the value of LGD may be traded directly (without the use of any formula). The market estimate of LGD, and thus the futures price, will change from time to time.

At some point in time following a credit event on the $i^{th}$ obligor in the index, the value of the default swap will be determined/fixed at a defined amount, $LGD \cdot n_i$, in the present embodiment. One final variation margin payment is made to reflect the fixing of LGD. Following this final variation margin payment, the credit default swap on the obligor having suffered a credit event terminates. The same effect may be achieved by physically settling the obligations arising out of a credit event. Rather than a final variation margin payment of $LGD \cdot n_i$, the protection seller is paying $n_i$ and gets from the protection buyer a defined reference obligation of the reference obligor with a nominal value of $n_i$ delivered.

The protection buyer may pay for credit protection at the end of each day for all obligors that had not suffered a credit event on the close of the prior trading day.

For each and every obligor, credit events may be defined using the standard ISDA architecture. While not limited to these examples, the active credit events may be bankruptcy and failure to pay only. It is to be noted that the invention is likewise applicable to any other kind of credit events.

Payments of variation margins may be done on a daily basis. The daily margin movements of the futures contract are then intended to closely replicate daily changes in the present value of a portfolio of N sources of credit risk as described above. Daily payments may reflect the change in present value due to: (i) the evolution of the average survived credit spread during a trading day; (ii) the effect of a credit event (e.g. bankruptcy) occurring; and (iii) the protection buyer's payment for each day's credit protection.

A possible payment approach to reflect the evolution of the average survived credit spread and the occurrence of credit events will now be described in more detail. On each day, a (positive or negative) payment is due from the protection seller to the protection buyer calculated as the total of the following amount (expressed for initial notional of the contract of one, i.e. unity), for a futures contract based on the main bundle of default swaps:

$$N_{today} \cdot CDS(CS_{average, today}, CS_{average, initial}, S_{today}, T_{today})$$

$$-N_{yesterday} \cdot CDS(CS_{average, yesterday}, CS_{average, initial}, S_{yesterday}, T_{yesterday}) \quad (1)$$

for one or more futures contract(s) based on each separated default swap:

$$+\Sigma n_i \cdot CDS(CS_{i, today}, CS_{average, initial}, S_{today}, T_{today})$$

$$\Sigma n_i \cdot CDS(CS_{i, yesterday}, CS_{average, initial}, S_{today}, T_{today})$$

$$-\Sigma n_i \cdot LGD_i \quad (1')$$

It is to be noted that the separated contracts develop a life of their own, i.e. they can be traded in their own right, and ownership can change as well with such trading activity.

With regard to futures contracts based on separated default swaps (i.e. on obligors that have suffered a separation event): the first summation is taken over the obligors that suffered a separation event or credit event at any time prior to the close of today's trading day but for which the value of LGD has yet to be determined. The second summation is taken over the obligors that suffered a separation event at any time prior to the close of yesterday's trading day, but for which the value of LGD has yet to be determined. The third summation is taken over obligors that have suffered a credit event and where the value of LGD was determined on the trading day. In expression (1'), note that the value of any futures contract based on an obligor having suffered a separation event may either be calculated using a credit spread and the CDS formula, as shown in lines 1 and 2 of expression (1'), or, may be estimated directly by the market. In this latter case, lines 1 and 2 of expression (1') may be taken to mean the market price (e.g. in euros or dollars) for each separated default swap on today and yesterday, respectively. In case of physical settlement of a credit event line 3 of expression (1') can be economically substituted by the process of the physical delivery of a reference obligation of the defaulted reference obligor against payment of 100% of the nominal of the delivered reference obligation. Terms in expressions (1) and (1') have the following meanings:

$N_{today}$ is the weight due to the obligors surviving (i.e. not having cumulatively suffered a separation event) after the close of trading day;

$N_{yesterday}$ is the weight due to the obligors surviving (i.e. not having cumulatively suffered a separation event) after the close of the prior trading day;

$CS_{average, today}$ is the average credit spread at the end of the day, averaged over the obligors that have survived at the end of the day;

$CS_{average, yesterday}$ is the average credit spread at the end of yesterday, averaged over the obligors that survived at the end of the prior trading day;

$CS_{average, initial}$ will be the average credit spread of all obligors in the index at the time the futures contract was launched;

$CS_{i, today}$ is the credit spread of the $i^{th}$ obligor at the end of the day;

$CS_{i, yesterday}$ is the credit spread of the $i^{th}$ obligor at the end of yesterday;

$S_{today}$ is the (e.g. linearly) interpolated swap rate for maturity T on the valuation day;

$S_{yesterday}$ is the (e.g. linearly) interpolated swap rate for maturity T on the prior valuation day;

$T_{today}$ is the maturity of the notional CDS contracts, i.e. 5 years plus the time remaining until the futures contract matures; and $T_{yesterday}$ is the maturity of the notional CDS contracts as measured on the last trading date.

In the definitions shown above, the indication "yesterday" means the futures trading date preceding today.

Further, the value of the underlying default swap may be deduced. When defining the functional expression CDS with its operands to be $$\text{CDS (current credit spread, strike credit spread, swap rate, maturity)} \quad (2)$$

a generic formula may be used which has the property that its output is a number that is close to the clean present value of a credit default swap. There may be several such formulas which could be used in general prior to credit events. For instance, CDS may be defined as follows:

$$CDS = \frac{(CS_{current} - CS_{initial}) \cdot (1 - e^{-(h+r)T})}{h + r} \quad (3)$$

In this equation,

1. $h = CS_{current} \cdot DCF/(1-\text{recovery})$ \quad (4)

i. $r = \ln(1+S)$ \quad (5)

Equation (3) provides a simple but accurate means of calculating the present value of a default swap prior to the occurrence of a credit event.

The value of a credit default swap after the occurrence of a credit event is given by the net amount paid by the protection seller to the protection buyer after a credit event, i.e. the par value of a bond (e.g. $100) minus the recovery rate of a bond having suffered a credit event. This amount, the 'loss given default' is labelled LGD. $LGD_i$ is the defined payment per unit notional paid to the protection buyer following a credit event suffered by obligor i. The recovery rate in equation (4) may be used to initially determine the value of LGD.

Separation events may be defined as events indicating a severe deterioration of an obligor's creditworthiness, and are defined by the futures contract. Separation events can include, but are not exclusively defined as, credit events (which are themselves usually defined by market documentation, such as the ISDA 2003 Standard Credit Default Swap Confirmation), such as bankruptcy or restructuring. Separation events may also be defined as the time when the credit spread of an obligor first exceeds some maximum permitted threshold. The separation therefore allows trading the non-defaulted index names and the defaulted name as two separate contracts. Also the margining and quotation of the contracts might differ from the time the separation has taken place.

While separation events may be exclusively defined as credit events meaning that the separation event and credit event occur synchronously, it would also be possible for a separation event (such as a large increase in an obligor's credit spread) to occur prior to a credit event (e.g. that obligor's subsequent bankruptcy).

The contract valuation was described above to be based on a default swap which is calculated from an average spread. However, there may be further alternatives. For instance, the valuation may be based on the sum of the time dependent values for each individual default swap. This will now be described in more detail.

For example, the futures contract may be based on the total present value of N credit default swaps, where there is a credit default swap on each obligor in the index. The $i^{th}$ default swap may have notional equal to the total contract notional multiplied by $n_i$, where $n_i$ is the weight of the $i^{th}$ obligor in the index. The default swap may mature at a fixed date (e.g. 5 years) after the maturity of the futures contract.

In this example, default swaps that have not suffered a separation event are bundled together. Following a separation event the relevant default swap separates from the main bundle default swaps to enable trading in the main bundle of default swaps to remain liquid. Trading then continues separately on both the main bundle of non-separated default swaps, and on individual separated default swaps. Each credit default swap, whether separated or not, but that has not suffered a credit event, may be separately valued using the currently observable credit spread and the initial credit spread (observed at the futures launch date) of the relevant obligor. In case a separated contract is quoted based on LGD estimates, market LGD estimates are used for valuation.

At a time that may be equal to or following the occurrence of a credit event on the $i^{th}$ obligor in the index, the default swap may pay a defined amount, $LGD \cdot n_i$. After this payment, the default swap linked to the defaulted obligor may be eliminated and may make no further contributions to futures cash flows for the remaining life of the future. In case of a physical settlement of the obligation resulting out of a credit event, the final LGD payment is substituted by the physical delivery of the reference obligation with a nominal of $n_i$ against payment of 100% of the nominal $n_i$ of the delivered reference obligation.

At the end of each day the protection buyer may pay for credit protection on each default swap that has not suffered a credit event, i.e. the payment for credit protection is not made if an obligor has defaulted. Protection payments may be made where a separation event but not a credit event has occurred. For each individual default swap the daily payment of premium may be derived from the initial credit spread of the relevant obligor on the futures launch date.

Given this embodiment, expressions (1) and (1') read as follows, for a futures contract based on the main bundle of default swaps:

$$\Sigma[n_{i, today} \cdot CDS(CS_{i, today}, CS_{i, initial}, S_{today}, T_{today})]$$

$$-\Sigma[n_{i, yesterday} \cdot CDS(CS_{i, yesterday}, CS_{i, initial}, S_{today}, T_{today})] \quad (1a)$$

for one or more futures contract(s) based on each separated default swap:

$$\Sigma[m_{i, today} \cdot CDS(CS_{i, today}, CS_{i, initial}, S_{today}, T_{today})]$$

$$-\Sigma[m_{i, yesterday} \cdot CDS(CS_{i, yesterday}, CS_{i, initial}, S_{today}, T_{today})]$$

$$+\Sigma(w_i \cdot LGD_i) \quad (1'a)$$

where:

$n_i$ refers to the obligors that have not suffered a separation event;

$m_i$ refers to the obligors that have suffered a separation event and/or a credit event, but for which the value of LGD has not been fixed;

$w_i$ refers to the notional of obligors suffered a credit event for which the value of LGD was determined in accordance with the futures contract documentation on the trading day;

$CS_{i, today}$ is the credit spread of the ith obligor at the end of the day;

$CS_{i, yesterday}$ is the credit spread of the ith obligor at the end of yesterday; and $CS_{i, initial}$ is the credit spread of the ith obligor at the launch of the futures contract.

As described above, the techniques may use weights. In one example, "weights" may be understood to be weighting factors of obligors relevant for determining average credit spread and the nominal. Each obligor in the index may have its own weight. Software can deal with equal and non-equal weighted baskets. The weighting could also be 100%, basically representing a single name CDS. In an alternative example, "weights" may be understood to be weighting factors of each CDS in the CDS basket. Again, software can deal with equal and non-equal weighted baskets. The weighting could also be 100%, basically representing a single name CDS.

The techniques described so far mainly deal with credit events in form of cash settlement for the defaulted nominal based on an extraordinary LGD (loss given default) payment for the protection buyer. In some examples, the LGD value is determined by (100−recovery rate). In alternative examples, the recovery rate could either be a prespecified number at contract listing or could be determined at the time the credit event occurs, e.g. by a market poll.

These and other techniques for valuing and managing futures contracts that are based on a basket of credit default swaps as underlyings, are described in more detail in European patent applications 03 026 605 and 04 009 013 the contents of which is herewith incorporated by reference in their entirety. In particular, the separation and settlement approaches described therein are also applicable to the present invention.

Valuation of the Bundle of Constructs

Figure 2:
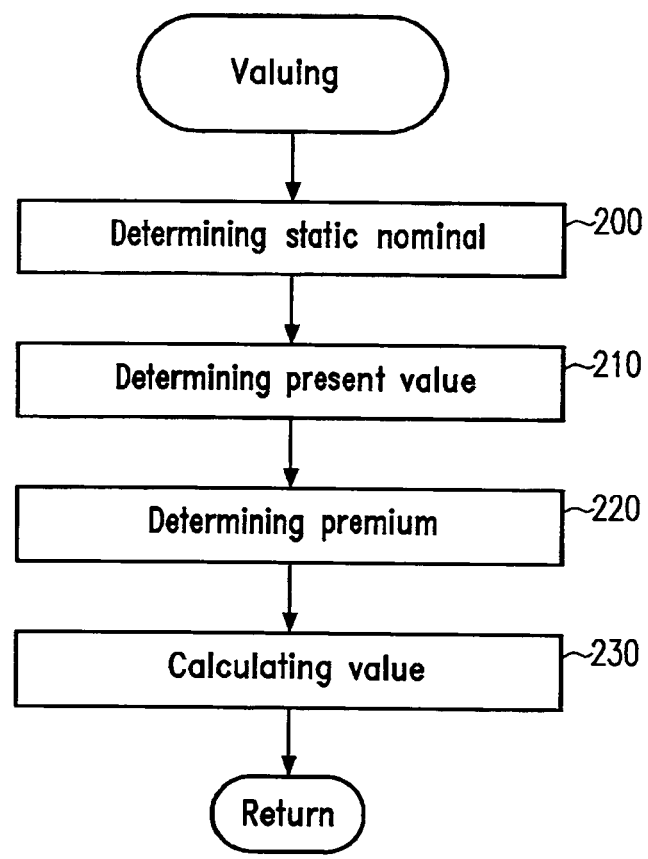
FIG. 2 illustrates a data processing method according to an embodiment of the invention.

Referring now to FIG. 2, the process of valuing a bundle of constructs according to an embodiment is depicted. As apparent therefrom, a static nominal is determined in step 200, a present value of the bundle is determined in step 210, and a premium value is determined in step 220. Finally, the value of the bundle of constructs is calculated in step 230.

Although steps 200, 210 and 220 are depicted in FIG. 2 in a given order, it is to be noted that the sequence of method steps may be arbitrarily changed.

As will be described in more detail below, the value of the bundle of constructs calculated in step 230 is calculated as a sum of the static nominal, present value and premium value determined in steps 200 to 220.

Taking the example of a futures contract that is based on a basket of credit default swaps, the futures price may be interpreted as portfolio value. In order to derive the comparable market exposure, the quoted futures price which looks like a bond price may be multiplied with a multiplier. For instance, if the futures price is 100.00 and a multiplier of 10$/0.01 (which is 1,000$/1) is chosen, the portfolio value amounts to $100,000.

The overall portfolio value is then determined by the following three values: portfolio nominal, portfolio present value, and portfolio premium.

The portfolio nominal is a static value that is determined by reducing a static base number each time a separation event occurs. Thus, the static nominal represents the nominal of the survived obligors, hence the exposure. In the present embodiment, the static nominal is only affected by defaults which lead to a reduction of that number by the weighting of the defaulted name. For instance, if the static base nominal is 100, and one of the names (e.g. the 57$^{th}$) which has a weighting of 1% defaults, the static nominal is reduced by 1, leading to a new static value of 99. Thus, a credit event leads to a nominal reduction of the underlying nominal by the weighting of the defaulted name. Consequently, the static value reflects the nominal reduction of the contract in a credit event, and thus reflects the consequences of a credit event.

The portfolio present value is determined by applying a predefined model after having separated the name defaulted. Thus, the portfolio present value may be calculated based on standard market pricing models and on survived obligors only. In other words, the present value may be based on the mark to market value of a CDS basket with a nominal equal to the portfolio nominal. For instance, if the portfolio experienced a default of a name with a weighting of 1%, the present value is calculated for the reduced portfolio nominal of 99.

In an embodiment, the present value may reflect spread changes of the underlying. In this case, the present value fluctuates with credit spread changes, and the implied spread could easily be backed out of the futures price.

Finally, the portfolio premium is a value that is calculated in an accumulative manner on a predefined time basis. For instance, the portfolio premium may be calculated on a daily basis, with weekends and bank holidays being considered accordingly. Again, the premium value is calculated based on survived obligors only. In an embodiment, the premium is credited/debited for open positions at the end of the day based on the fixed credit spread of the contract.

Taking the above example of a starting number of 100 names, and assuming that at time $t_1$ one name having a weighting of 1% defaults, the portfolio nominal for the time interval from $t_0$ to $t_1$ is 100, and from $t_1$ to the expiry date $t_{EX}$ is 99. Assuming a CDS portfolio premium of x %, the portfolio premium at the time of expiry is:

$$\left[\frac{t_1 - t_0}{a} \cdot 100 \cdot x\ \%\right] + \left[\frac{t_{EX} - t_1}{a} \cdot 99 \cdot x\ \%\right] \quad (6)$$

where a is the number of days per year, which may for instance be 360 or 365 or any other value, depending on the daycount convention used. The premium value thus includes an accrued carry element which is corrected in case of a default. In principle, the premium may indicate a substantially linear increasing pricing effect over the lifetime of the future. This is because may reflect the daily protection payment. If a default occurs, the carry calculation is adjusted accordingly.

Once the three values are determined, the futures price is calculated by calculating a sum of the portfolio nominal, the portfolio present value, and the portfolio premium. Thus, the futures price is dependent on:

defaults: all of the three values (portfolio nominal, portfolio present value, and portfolio premium) are determined based on the survived obligors;

credit spread changes: the portfolio present value of the present embodiment is determined based on a spread-based market pricing model; and the collected premium at the trading or expiry day of the contract.

Consequently, a price is achieved that reflects all of the three influencing quantities in a manner that can be easily monitored.

Referring now to FIGS. 3-1 to 3-5, a nearly realistic example is given. This example is based on the following sample data:

| Day | Portfolio Nominal | Current Market Spread | Portfolio Present Value | Portfolio Premium | Futures Price |
|---|---|---|---|---|---|
| 1 | 100 | 0.40 | 0.00000 | 0.00111 | 100.00111 |
| 2 | 100 | 0.38 | 0.09000 | 0.00222 | 100.09222 |
| 3 | 100 | 0.40 | 0.00000 | 0.00333 | 100.00333 |
| 4 | 100 | 0.42 | −0.09000 | 0.00444 | 99.91444 |
| 5 | 100 | 0.43 | −0.13500 | 0.00556 | 99.87056 |
| 8 | 100 | 0.45 | −0.22500 | 0.00889 | 99.78389 |
| 9 | 100 | 0.46 | −0.27000 | 0.01000 | 99.74000 |
| 10 | 100 | 0.44 | −0.18000 | 0.01111 | 99.83111 |
| 11 | 100 | 0.43 | −0.13500 | 0.01222 | 99.87722 |
| 12 | 100 | 0.45 | −0.22500 | 0.01333 | 99.78833 |
| 15 | 100 | 0.48 | −0.36000 | 0.01667 | 99.65667 |
| 16 | 100 | 0.50 | −0.45000 | 0.01778 | 99.56778 |
| 17 | 100 | 0.55 | −0.67500 | 0.01889 | 99.34389 |
| 18 | 100 | 0.52 | −0.54000 | 0.02000 | 99.48000 |
| 19 | 100 | 0.54 | −0.63000 | 0.02111 | 99.39111 |
| 22 | 100 | 0.56 | −0.72000 | 0.02444 | 99.30444 |
| 23 | 100 | 0.52 | −0.54000 | 0.02556 | 99.48556 |
| 24 | 100 | 0.50 | −0.45000 | 0.02667 | 99.57667 |
| 25 | 100 | 0.53 | −0.58500 | 0.02778 | 99.44278 |
| 26 | 100 | 0.54 | −0.63000 | 0.02889 | 99.39889 |
| 29 | 100 | 0.56 | −0.72000 | 0.03222 | 99.31222 |
| 30 | 100 | 0.58 | −0.81000 | 0.03333 | 99.22333 |
| 31 | 100 | 0.60 | −0.90000 | 0.03444 | 99.13444 |
| 32 | 100 | 0.62 | −0.99000 | 0.03556 | 99.04556 |
| 33 | 100 | 0.63 | −1.03500 | 0.03667 | 99.00167 |
| 36 | 100 | 0.64 | −1.08000 | 0.04000 | 98.96000 |
| 37 | 99 | 0.45 | −0.22275 | 0.04110 | 98.81835 |
| 38 | 99 | 0.46 | −0.26730 | 0.04220 | 98.77490 |
| 39 | 99 | 0.48 | −0.35640 | 0.04330 | 98.68690 |
| 40 | 99 | 0.49 | −0.40095 | 0.04440 | 98.64345 |
| 43 | 99 | 0.52 | −0.53460 | 0.04770 | 98.51310 |
| 44 | 99 | 0.51 | −0.49005 | 0.04880 | 98.55875 |
| 45 | 99 | 0.53 | −0.57915 | 0.04990 | 98.47075 |
| 46 | 99 | 0.54 | −0.62370 | 0.05100 | 98.42730 |
| 47 | 99 | 0.56 | −0.71280 | 0.05210 | 98.33930 |
| 50 | 99 | 0.58 | −0.80190 | 0.05540 | 98.25350 |
| 51 | 99 | 0.63 | −1.02465 | 0.05650 | 98.03185 |
| 52 | 99 | 0.64 | −1.06920 | 0.05760 | 97.98840 |
| 53 | 99 | 0.62 | −0.98010 | 0.05870 | 98.07860 |
| 54 | 99 | 0.63 | −1.02465 | 0.05980 | 98.03515 |
| 57 | 99 | 0.68 | −1.24740 | 0.06310 | 97.81570 |
| 58 | 99 | 0.70 | −1.33650 | 0.06420 | 97.72770 |
| 59 | 99 | 0.72 | −1.42560 | 0.06530 | 97.63970 |
| 60 | 99 | 0.73 | −1.47015 | 0.06640 | 97.59625 |
| 61 | 99 | 0.70 | −1.33650 | 0.06750 | 97.73100 |
| 64 | 99 | 0.72 | −1.42560 | 0.07080 | 97.64520 |
| 65 | 99 | 0.73 | −1.47015 | 0.07190 | 97.60175 |
| 66 | 99 | 0.70 | −1.33650 | 0.07300 | 97.73650 |
| 67 | 99 | 0.71 | −1.38105 | 0.07410 | 97.69305 |
| 68 | 99 | 0.75 | −1.55925 | 0.07520 | 97.51595 |
| 71 | 99 | 0.77 | −1.64835 | 0.07850 | 97.43015 |
| 72 | 98 | 0.65 | −1.10250 | 0.07956 | 96.97706 |
| 73 | 98 | 0.62 | −0.97020 | 0.08061 | 97.11041 |
| 74 | 98 | 0.61 | −0.92610 | 0.08167 | 97.15557 |
| 75 | 98 | 0.58 | −0.79380 | 0.08272 | 97.28892 |
| 78 | 98 | 0.56 | −0.70560 | 0.08589 | 97.38029 |
| 79 | 98 | 0.52 | −0.52920 | 0.08694 | 97.55774 |

| Day | Portfolio Nominal | Current Market Spread | Portfolio Present Value | Portfolio Premium | Futures Price |
|---|---|---|---|---|---|
| 80 | 98 | 0.50 | −0.44100 | 0.08800 | 97.64700 |
| 81 | 98 | 0.53 | −0.57330 | 0.08906 | 97.51576 |
| 82 | 98 | 0.48 | −0.35280 | 0.09011 | 97.73731 |
| 85 | 98 | 0.47 | −0.30870 | 0.09328 | 97.78458 |
| 86 | 98 | 0.46 | −0.26460 | 0.09433 | 97.82973 |
| 87 | 98 | 0.45 | −0.22050 | 0.09539 | 97.87489 |
| 88 | 98 | 0.40 | 0.00000 | 0.09644 | 98.09644 |
| 89 | 98 | 0.39 | 0.04410 | 0.09750 | 98.14160 |
| 90 | 98 | 0.38 | 0.08820 | 0.09856 | 98.18676 |

Figures 1, 3:
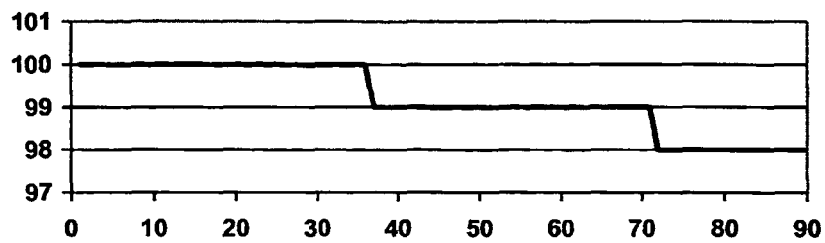
Figures 2, 3:
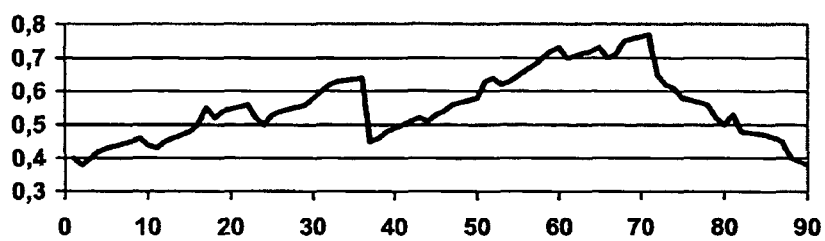
Figure 3:
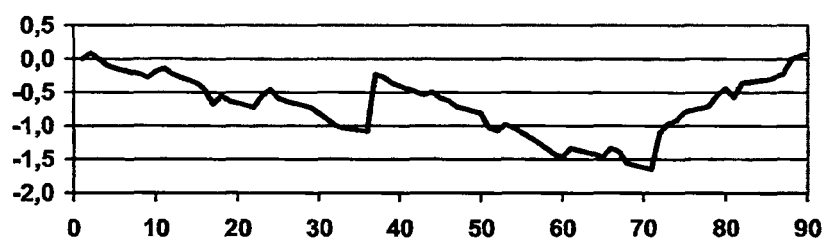

Referring first to FIG. 3-1, the time development of the static nominal is depicted, determined in step 200. As in the examples above, the static base number is 100, and the weighting of the credit default swaps that defaulted on the 37$^{th}$ and 72$^{nd}$ day were 1%.

FIG. 3-2 depicts the time development of the current market spread. Using this current market spread, the portfolio present value is determined in step 210 to achieve the curve as shown in FIG. 3-3. That is, any spread changes are translated into a price change based on a predefined valuation model. As can be seen from FIG. 3-3, there are price swings in the conversion from 100 to 99 name index contracts and also in the conversion from 99 to 98. Such price swings are often undesirable when monitoring the basket's behavior.

Figures 3, 4:
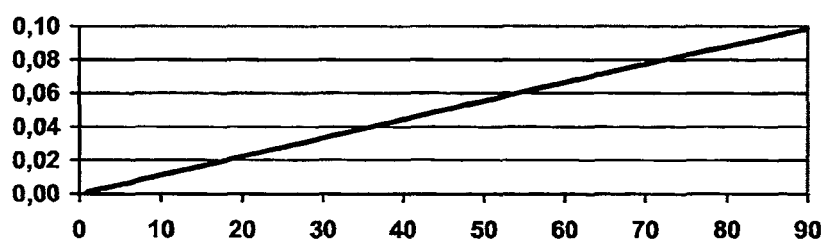

Referring now to FIG. 3-4, the premium value determined in step 220 is depicted. As discussed above, the premium value is substantially linear in time. However, as the premium increment is calculated using the survived obligors only, the slope of the curve will slightly decrease with each separation. Further, there may be some jumps on weekends and bank holidays.

Figures 3, 4, 5:
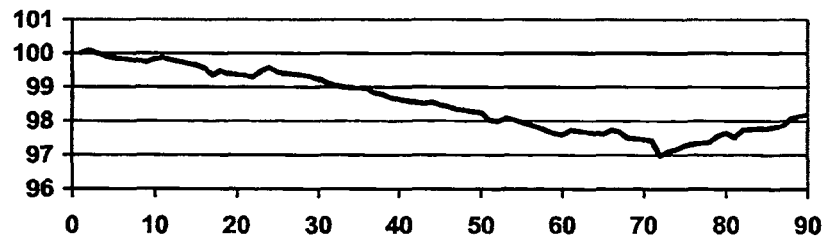

FIG. 3-5 depicts the resulting price of the futures contract that is achieved by summing up the values depicted in FIGS. 3-1, 3-3 and 3-4. As can be seen from FIG. 3-5, there are no drastic changes at the time of separation, although the price value is still dependent on defaults. That is, the price swings occurring in the present value depicted in FIG. 3-3 are compensated so that the curve is given a bond-like look that nevertheless enables one to reflect defaults and subsequent nominal reductions.

The foregoing description mainly dealt with techniques of how to value a basket of credit default swap in a separation event. As to the failing credit default swap(s), one embodiment initiates a one off payment for each failing credit default swap that is separated from the basket. In another embodiment, new futures contracts are created for each failing credit default swap that is separated from the basket.

Glossary of Terms

The following glossary of terms may be used to better understand the invention.

A "30/360 daycount basis" assumes that there are 360 days in a year and 30 days in each month.

"ACT/360" is a day count convention used for many bonds and default swaps.

"Arbitrage" is the act of simultaneously buying and selling of very similar financial instruments in different markets in order to profit from short term price differences between those markets.

An "asset swap" is the combination of the purchase of a fixed rate bond together with an interest rate swap where the fixed rates are paid (and the fixed rate is the scheduled coupons of the purchased bond) and floating rates are received.

A "basis point" is 0.01 percent, usually of an interest rate or a credit spread.

A "Binary default swap" is a credit default swap where the amount paid by the protection seller following a credit event is fixed and is not a function of the recovery rate of the reference obligation after the credit event.

"Bootstrapping" is a recursive process by which future interest rates can be calculated from earlier interest rates. For example, bootstrapping may be used to determine the zero coupon rate from a known yield curve for successive points in time.

"Cash settlement" is the process in which traders receive or pay the losses or gains on a futures contract in cash. Cash settlement is an alternative to the physical delivery of the goods specified in the futures contract.

A "clean function" is a bond or default swap valuation which excludes accrued interest. Accrued interest is interest owed but not yet paid for the historic period between the last coupon date and the valuation date.

The "clean price" is the price of a bond or default swap, excluding accrued interest.

A "clearing agent" or a "clearinghouse" is a type of exchange where transactions between brokers are executed.

A "contract specification" is the exact parameters (including pricing models and inputs, if any) of any futures contract.

A "corporate bond" is a debt obligation of a corporate issuer. The investor in the corporate bond bears the risk that the corporate might default on the payment obligation.

A "credit default swap" is a contract where the protection seller agrees to purchase from the protection buyer an obligation issued by a reference entity for its par value after the occurrence of a credit event. In return, the protection buyer agrees to pay a premium to the protection seller until the earlier of the maturity of the credit default swap and the date of a credit event.

A "credit derivative" is a financial instrument that enables the isolation and separate transfer of credit risk. Credit derivatives have credit contingent payoffs that are only triggered following a credit event. For example in a credit default swap, after a credit event, the protection seller buys a defaulted bond from the protection buyer for its par value.

A "credit event" is an event that triggers the credit contingent payment of a credit derivative. Standardized credit events are commonly traded and include: bankruptcy, failure to pay, obligation default, obligation acceleration, repudiation/moratorium and restructuring.

The "credit event announcement time" is the time after the close of trading each day when the exchange formally announces credit events deemed to have occurred.

A "credit spread" is the difference (usually quoted in basis points) between the yield on a reference obligation and the yield on the equivalent risk free debt instruments of the same maturity.

A "counterparty" is one of two parties to an agreement. If two parties agree to something, they are both a counterparty to the agreement, and they may both be collectively referred to as the counterparties to the agreement. The terms agreement and contract may be used synonymously.

A "coupon" is a statement of interest owed that may be detached from a bond and separately redeemed at a specified time.

"Discount factors" are numbers derived from a zero coupon curve that are used to determine the present value of one or more cash flows. Thus, a discount factor $d_i$ is the present value of $1 received in the future at time i.

The "discount rate" is the rate used to calculate the present value of future cash flows. Typically, the discount rate accounts for at least the interest that could be obtained in a relatively risk free investment, such as a Treasury bill.

The "effective date" is the date and time at which parties have previously agreed to cash settle a futures contract.

"Equilibrium zero rates" are zero rates derived from the midpoint between bid and asked quotes for a yield curve.

The "European Interbank Offered Rate" (EURIBOR) is a short term interest rate at which banks are willing to lend funds to other banks in the interbank market. EURIBOR interest rates are determined by a group of banks located in Europe.

An "exchange" is an organization that brings together buyers and sellers of particular assets. Typically, the exchange makes rules that govern participation and trading.

A "failure event" may be any event of severe deterioration of the value of an individual reference construct. If a failure event leads to a separation of a construct out of a bundle, the failure event may be considered to be a separation event.

"Forward interest rates" are the interest rates fixed today on loans to be made at corresponding future dates.

A "future" is a standardized contract that is bought or sold, respectively, for future acceptance or delivery. It is also possible to cash settle futures contracts by reference to the fixing value of the underlying financial instrument on the futures expiry date.

A "future time period" is a date and time that has not yet occurred.

A "futures contract" is an agreement to buy or sell a financial instrument on a future date at a price that is fixed today.

A "futures exchange" is an organization that brings together buyers and sellers of futures contracts.

The "futures price" of an asset is the price of an asset today for delivery in the future.

"To hedge" is to invest in a first asset to reduce the risk associated with a second asset. Generally, the value of the first and second assets are related inversely, so that when the value of the first asset decreases, the value of the second assets increases, and vice versa. A perfect hedge results when the two sides of a hedge move together in exactly the same proportion.

A "hedge ratio" or "delta" is the number of units of an asset needed to hedge one unit of a liability.

The "implied zero curve" is a zero coupon curve derived from a coupon or swap curve.

"Interest rate risk" is the potential monetary gain or loss on a financial instrument if interest rates changed from their current value.

The "International Money Market" (IMM) is the financial futures market within the Chicago Mercantile Exchange.

"ISDA" is the International Swaps and Derivatives Association, the trade organisation for the credit derivatives industry.

The "London Interbank Offered Rate" (LIBOR) is a short term interest rate at which banks are willing to lend funds to other banks in the interbank market.

A "long position" is a position which has been purchased for value, as opposed to a position which has been sold.

"Loss given default" ("LGD") is the amount paid by a protection seller to a protection buyer in a credit default swap after a credit event occurs. Loss given default is defined as a loss on a reference debt instrument, usually given as the par value less the recovery rate of the reference debt instrument observed after the credit event in the bond market. In addition, loss given default can be defined to be a binary amount so that a fixed amount is paid out after a credit event regardless of the actual post credit event recovery rate.

"Margin" is the amount of money that an exchange requires as deposit in order for a dealer to maintain an account.

"Margining" is the practice of maintaining a minimum margin with an exchange. For example, if the account of the first dealer has decreased by $10,000 from the previous time period in which margining occurred, the dealer pays the entity that oversees trading $10,000. For most futures contracts, margining occurs daily after the close of trading because the contracts are marked-to-market.

"Marking to market" is the practice of calculating the profits and losses on a contract at the end of each day and settling up between the exchange and the dealers. Most, if not all, futures contracts are marked-to-market. Marking to market is also called daily settlement.

"Maturity" is the date and time at which the obligation represented by a financial instrument terminates. For example, a 10 year bond issued today matures 10 years from today.

The "net preset value" (NPV) of an investment is the sum of the present value of all cash flows resulting from an investment.

"Netting" is the act of offsetting credit exposure between financial institutions.

Netting is also the process by which multiple obligations between parties are offset against one another to reduce (and minimize, if possible) the number of transactions required to fulfil the multiple obligations. For example, if a first dealer owes the second dealer $100, and the third dealer owes the first dealer $100, both obligations are netted by a single payment of $100 from the third dealer to the second dealer.

"Over-the-counter" (OTC) is an informal market that does not involve a futures exchange.

"To pay fixed" means to pay a fixed interest rate, usually as part of an interest rate swap.

The "present value" (PV) is the value of a future sum of money today, based on a particular discount rate.

A "protection buyer" is a credit derivative user that wishes to reduce credit risk exposure to a specific reference entity and pays a counterparty to do so.

A "protection seller" is a credit derivative user that is willing to take on additional credit risk of a specific reference entity in return for an appropriate fee.

The "recovery rate" is the proportion of face value of debt that an investor would be able to recover (either through sale of the debt or through the liquidation process) following a credit event.

The "reference entity" is the issuer of the debt obligations referenced in a credit derivative trade.

The "repo rate" is the interest rate applicable to principal amount loaned as a result of a repurchase agreement.

A "repurchase agreement" or "repo" is a short-term loan agreement by which one party sells an asset to another party, but promises to buy back the asset at a specified time.

"Selling short" is the process of making a short sale.

A "separation event" may be any event of some influence on a resource amount update for counterbalancing a transfer of a failure risk pertaining to a bundle of constructs, potentially leading to a decision, when managing bundles of constructs that may individually fail, to separate one or more individual constructs out of one or more of the managed bundles. For example, a separation event corresponds to a serious degradation of the creditworthiness of an obligor. A separation event could be defined to include credit events, and/or adverse changes in credit rating, and/or credit spreads exceeding predefined maximum thresholds. The occurrence of a separation event on an obligor causes the futures contract to separate into two separately traded futures contracts—one based on the bundle of non-separated obligors, and another based on the separated obligor.

A "short sale" is the sale of an asset that an investor does not own. The investor is obligated to buy the same amount of the asset that was sold short at a later date.

"Shorting" is the act of selling an asset which one does not own at the time of sale.

"Spread" refers to an observable market price for the isolated credit risk of a defined obligor expressed in yield basis points (credit spread).

"Survived" refers to names in the index that have not suffered a credit event on or in the time prior to a valuation date.

"Stub calculations" are interest calculations relating to the period of time, either before or after a defined date.

The "three month LIBOR rate" is the LIBOR rate for a three month loan. If a counterparty to an IRS pays floating interest based on the three month LIBOR rate, that counterparty makes an interest payment every three months, the amount of which is determined by multiplying the then current three month LIBOR rate by the notional amount.

"Trading desks" are the place where traders send and receive information and execute trades.

A "transparent" price describes a price derived from standardized terms and a single pricing model that is generally applicable to all circumstances.

A "Treasury" is a debt issued by the U.S. government. "Treasury bills" mature in less than a year, "Treasury notes" mature from one year to under 10 years, and "Treasury bonds" take 10 or more years to mature.

"Treasury accrued interest" is the accrued interest on a Treasury bond for a period of time.

"Values" may be the values of any data, which could be spreads, weights, credit events. Those variables might be fixed parameters for calculation purposes or might change over time. A value could also be a result of a calculation.

"Variation margin" is the payment due to or from an exchange (usually made each trading day) as a result of the change in value of a exchange traded contract.

A "yield" is a profit expressed as a percentage of the investment made to achieve that profit. If a $ 100 investment pays $106 in a year, the annual yield is 6%.

A "yield curve" is the relationship between future interest rates and time. A graph showing the interest yield of securities displaying the same characteristics as government securities is known as a par coupon yield curve. The U.S. Treasury yield curve is an example of a par coupon yield curve.

The "yield spread" is the difference in yield between two fixed income instruments.

A "zero-coupon bond" does not pay interest at periodic intervals; rather, it is issued at a discount from its par (or face) value and is redeemed at par. For example, a bond that costs $60, pays no interest, but is redeemable for $100 in 20 years, is a zero-coupon bond.

The "zero coupon discount factor" is the discount factor for a zero coupon bond.

The "zero-coupon rate" is the yield on a zero-coupon bond. All coupon bonds has an equivalent zero-coupon rate that is equal to the yield of a zero coupon bond having an NPV equal to the coupon bond.

The "zero-coupon yield curve" or "zero coupon curve" is a graph or relationship of the internal rate of return of zero-coupon bonds over a range of maturities.

"Zero rates" are zero coupon rates, usually derived from a par coupon curve, that are used to determine discount factors.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A data processing system for valuing a futures contract that is based on a basket of credit default swaps as underlyings, in case of a separation event causing said futures contract to separate a failing credit default swap from the basket, the system comprising:
   a present value determination unit adapted to apply a market pricing model to determine a present value of said futures contract after having separated said failing credit default swap from the basket;
   a static value determination unit adapted to determine a static value by reducing a static base number each time a separation event occurs; and
   a contract value calculation unit adapted to calculate a futures contract value based on the determined present value and the determined static value, said contract value calculation unit being adapted to calculate a sum of the determined present value and the determined static value.

2. The data processing system of claim 1, wherein said static value determination unit is adapted to reduce a current static value in case of a separation event by a value reflecting the weight of the failing credit default swap in the basket.

3. The data processing system of claim 1, wherein said present value determination unit is adapted to determine said present value based on credit spread changes.

4. The data processing system of claim 3, wherein said present value determination unit is adapted to translate said credit spread changes into a price change based on a predefined valuation model.

5. The data processing system of claim 1, further comprising:
   a premium determination unit for determining a premium value,
   wherein said contract value calculation unit is adapted to calculate said futures contract value further based on the determined premium value.

6. The data processing system of claim 5, wherein said premium determination unit is adapted to determine said premium value by determining and accumulating premium subvalues for predefined time intervals.

7. The data processing system of claim 6, wherein said premium determination unit is adapted to determine said premium subvalues based on the credit default swaps still present in the basket at the respective predefined time intervals.

8. The data processing system of claim 6, wherein said basket of credit default swaps has a fixed credit spread, and said premium determination unit is adapted to determine said premium subvalues based on said fixed credit spread.

9. The data processing system of claim 5, wherein said contract value calculation unit is adapted to calculate a sum of the determined present value, the determined static value, and the determined premium value.

10. The data processing system of claim 1, adapted to initiate a one off payment for each failing credit default swap that is separated from the basket.

11. The data processing system of claim 1, adapted to create new futures contracts for each failing credit default swap that is separated from the basket.

12. A data processing method of valuing a futures contract that is based on a basket of credit default swaps as underlyings, in case of a separation event causing said futures contract to separate a failing credit default swap from the basket, the method comprising:
applying a market pricing model to determine a present value of said futures contract after having separated said failing credit default swap from the basket;
determining a static value by reducing a static base number each time a separation event occurs; and
calculating a futures contract value based on the determined present value and the determined static value, wherein calculating the futures contract value comprises calculating a sum of the determined present value and the determined static value.

13. The data processing method of claim 12, wherein determining the static value comprises reducing a current static value in case of a separation event by a value reflecting the weight of the failing credit default swap in the basket.

14. The data processing method of claim 12, wherein the present value is determined based on credit spread changes.

15. The data processing method of claim 14, wherein determine the present value comprises translating said credit spread changes into a price change based on a predefined valuation model.

16. The data processing method of claim 12, further comprising:
determining a premium value,
wherein said futures contract value is calculated further based on the determined premium value.

17. The data processing method of claim 16, wherein said premium value is determined by determining and accumulating premium subvalues for predefined time intervals.

18. The data processing method of claim 17, wherein said premium subvalues are determined based on the credit default swaps still present in the basket at the respective predefined time intervals.

19. The data processing method of claim 17, wherein said basket of credit default swaps has a fixed credit spread, and said premium subvalues are determined based on said fixed credit spread.

20. The data processing method of claim 16, wherein calculating the futures contract value comprises calculating a sum of the determined present value, the determined static value, and the determined premium value.

21. The data processing method of claim 12, further comprising:
initiating a one off payment for each failing credit default swap that is separated from the basket.

22. The data processing method of claim 12, further comprising:
creating new futures contracts for each failing credit default swap that is separated from the basket.

23. A computer readable storage medium storing instructions that, when executed on a computer, cause said computer to value a futures contract that is based on a basket of credit default swaps as underlyings, in case of a separation event causing said futures contract to separate a failing credit default swap from the basket, comprising:
applying a market pricing model to determine a present value of said futures contract after having separated said failing credit default swap from the basket;
determining a static value by reducing a static base number each time a separation event occurs; and
calculating a futures contract value based on the determined present value and the determined static value, wherein calculating the futures contract value comprises calculating a sum of the determined present value and the determined static value.

* * * * *